(12) United States Patent  
Jorgensen

(10) Patent No.: US 7,445,704 B2  
(45) Date of Patent: Nov. 4, 2008

(54) OIL SEPARATION APPARATUS

(76) Inventor: Roy W. Jorgensen, 1709B N. Fares, Evansville, Vanderburgh County, IN (US) 47711

( * ) Notice: Subject to any disclaimer, the term of this patent is extended or adjusted under 35 U.S.C. 154(b) by 30 days.

(21) Appl. No.: 11/710,173

(22) Filed: Feb. 23, 2007

(65) Prior Publication Data

US 2007/0199871 A1  Aug. 30, 2007

Related U.S. Application Data

(60) Provisional application No. 60/776,713, filed on Feb. 24, 2006.

(51) Int. Cl.  
*B01D 17/025* (2006.01)

(52) U.S. Cl. .................... 210/86; 210/187; 210/519; 210/521; 210/538; 210/DIG. 5

(58) Field of Classification Search .................. 210/86, 210/104, 187, 519, 521, 538, 540, DIG. 5  
See application file for complete search history.

(56) References Cited

U.S. PATENT DOCUMENTS

| | | | | |
|---|---|---|---|---|
| 4,278,545 A | * | 7/1981 | Batutis et al. | 210/521 |
| 4,385,986 A | * | 5/1983 | Jaisinghani et al. | 210/538 |
| 5,132,010 A | * | 7/1992 | Ossenkop | 210/540 |
| 5,204,000 A | * | 4/1993 | Steadman et al. | 210/519 |
| 5,242,604 A | * | 9/1993 | Young et al. | 210/DIG. 5 |
| 5,431,826 A | * | 7/1995 | Becker et al. | 210/187 |
| 5,441,632 A | * | 8/1995 | Charon | 210/187 |
| 5,500,132 A | * | 3/1996 | Elmi | 210/540 |
| 5,520,825 A | * | 5/1996 | Rice | 210/DIG. 5 |
| 5,705,055 A | * | 1/1998 | Holloway et al. | 210/187 |
| 6,063,271 A | * | 5/2000 | Howard | 210/187 |
| 2004/0159606 A1 | * | 8/2004 | Thacker et al. | 210/521 |
| 2004/0222149 A1 | * | 11/2004 | Abrams | 210/519 |
| 2005/0051503 A1 | * | 3/2005 | Holland et al. | 210/538 |

\* cited by examiner

*Primary Examiner*—Christopher Upton  
(74) *Attorney, Agent, or Firm*—Gary K. Price, Esq.

(57) ABSTRACT

An above ground oil and water separator including a pump to draw potentially contaminated water from a containment area, and to supply a flow of water to an enclosure. An enclosure inlet pipe takes water from the diaphragm pump into the enclosure. A first sub-enclosure is formed within the enclosure by a wall containing a plurality of coalescing spheres. The coalescing spheres are bagged within the first wall and can be removed through an external lid during cleaning and removal of coalesced oil. A heat source contained within an electrical panel heats water and supplies the heated water to the enclosure to prevent freezing within the enclosure.

17 Claims, 3 Drawing Sheets

OIL SEPARATION APPARATUS

CROSS REFERENCES TO RELATED APPLICATIONS

U.S. Provisional Application for Patent No. 60/776,713, filed Feb. 24, 2006, with title "Oil Separation Apparatus" which is hereby incorporated by reference. Applicant claims priority pursuant to 35 U.S.C. par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

The present invention relates generally to an oil/water separation system, and more particularly to an above ground oil and water separator system.

2. Brief Description of Prior Art

In many environments there is a need to separate water from oil. Often times run off water from industrial sites and from parking lots must be treated prior to allowing it to flow into a city sewer or stream. It is common practice to use an oil separator with a coalescer to separate immiscible liquids and settleable solids.

U.S. Pat. No. 6,605,224, to Aymong discloses an oil/water separator that uses sloping coalescer plates to separate oil from water.

A limitation of the prior art is that it is commonly installed underground and that requires a service person to enter a confined space to service the apparatus when it becomes full of oil. Underground tanks must be monitored for underground leakage. Prior art oil separators also rely on visual inspection, which can lead to an unacceptable result of water with an oil sheen on top being expelled from the separator into the sewer.

As can be seen, there is a need for an improved oil separator that does not require a workman to enter a confined space and that reduces the risk of underground leaks and of accidental discharge of partially treated water into the storm sewer.

SUMMARY OF THE INVENTION

The present invention is directed to an above ground oil and water separator system that includes a pump to draw water from a containment area, and to supply a flow of water to an enclosure. An enclosure inlet pipe takes water from the diaphragm pump into the enclosure. A first sub-enclosure is formed within the enclosure by a wall containing a plurality of coalescing spheres. The coalescing spheres are bagged within the first wall and can be removed through an external lid during cleaning and removal of coalesced oil. A heat source contained within an electrical panel heats water and supplies the heated water to the enclosure to prevent freezing.

DESCRIPTION OF THE PREFERRED EMBODIMENT

Figure 1:
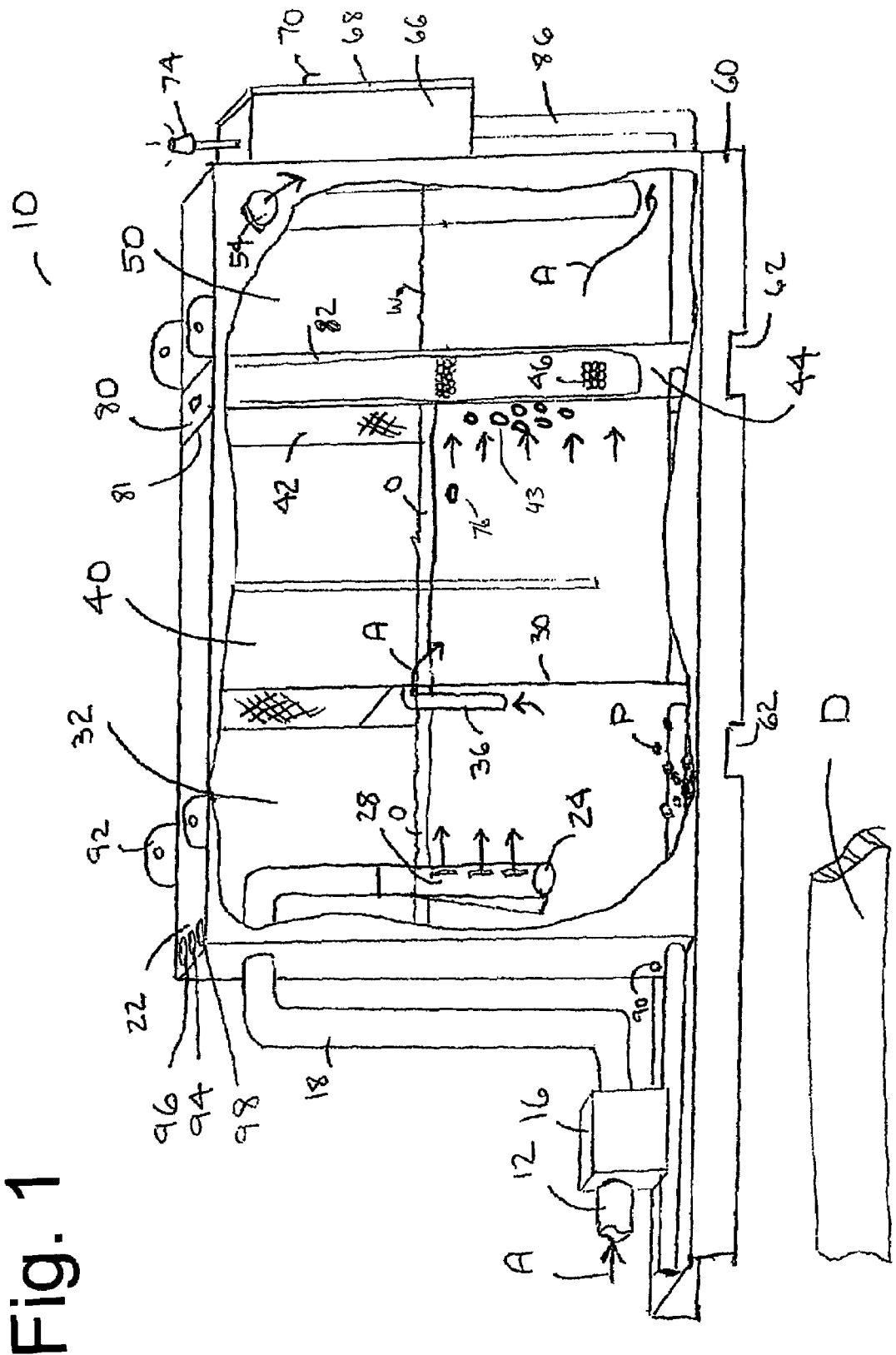
FIG. 1 shows a partial cross section of the present invention, an oil separation apparatus.

In accordance with the present invention, an oil separation apparatus is disclosed. FIG. 1 shows a partial cross sectional view of the oil separator system 10 that can be placed above ground in a water containment dike D, a portion of which is shown. The dike D allows for the collection of run off water from a parking lot or from roofs of buildings or from outdoor industrial equipment for example. The collected run off water may contain oil contamination or other immiscible contaminants that must be removed from the water prior to releasing the water from a city storm sewer for example. Placing the system 10 above ground has several advantages including a reduced need for cathodic protection when compared to underground systems common in the prior art.

The system 10 takes water in an inlet 12 which can be connected to a hose or pipe to reach a source of contaminated water not shown. Arrows A show the flow of water through the system 10. The flow of water is powered by a diaphragm pump 16. A suitable pump 16 might provide 30 gallons per minute of flow for example.

The pipe 18 provides an inlet for the enclosure 22. The inlet pipe 18 ends inside the enclosure 22 with a Y-shaped diffuser section 24. The diffuser section 24 includes 2 arms each of which has a plurality of slots 28 but diffuse the flow of water into the enclosure 22. The diffuser slots 28 spread the release of water into the enclosure to reduce turbulence, the slots 28 are normally located under the water lever W. It is desirable to reduce turbulence to accelerate the separation of oil from the water stream. A first wall 30 creates a first sub-enclosure 32. In the first sub-enclosure 32 larger dirt particles P can drop out of the water and some oil will separate to the top of the water W. The water is guided through a plurality of cross over pipes 36 located on the wall 30.

The second sub-enclosure 40 receives water from the first sub-enclosure 32 through cross over pipes 36 and allows for further settlement of dirt and separation of oil. The cross over pipes 36 allow water to be taken from sub-enclosure 32 below the level of oil "O" that may be floating on the surface of sub-enclosure 32. The wall 42 allows for water to pass through a containment area 44. The containment area 44 is filled with coalescer surfaces such as coalescer spheres 46. Water can flow slowly through the closely packed coalescer spheres 46. Spheres 46 are commercially available through KLEERWATER coalescer balls for example. Coalescer spheres 46 provide a surface for oil to separate from the water flow A. Oil O will separate from the water and collect on top of water in each sub-enclosure. Effective separation of oil from water is a function of providing time and surface area for oil to coalesce on. The coalescer spheres 46 provide a very high amount of surface area compared to the volume of the containment area 44, further the sphere shape allows for the coalesced oil to move vertically and to collect. Water flows into containment area 44 through the wall 42 which can include openings 43 through which water can flow, water leaves containment area through wall 49 which also has openings 43 through which the water can pass. The size of the openings 43 in each wall 42, 49 can be determined by the amount of flow required. The containment area 44 also includes a flow through bag 82 that holds coalescer spheres 46.

Sub-enclosure 50 takes water from the coalescer spheres 46. Water flows into the pipe 52 near the bottom of sub-enclosure 50 and out the outlet 54. The water containing a few parts per billion can be released into a city storm sewer for example.

The system 10 can include skids 60 to support the system 10. The skids 60 can include openings 62 that can allow the system 10 to be moved by forklift for example.

The system 10 includes an electrical panel 66. The electrical panel 66, pump 16 and all censors are explosion proof allowing the system 10 to achieve UL 142 labeling meaning the unit can be submerged in flammable liquids such as gasoline or diesel. The electrical panel 66 includes a door 68 and an opening device 70 such as a handle. The door 68 can include a lockout device to shut down the system 10 if the door 68 is open to service the system 10.

The electrical panel 66 can include an external alarm light 74 that can alert operators to conditions such as when the system 10 needs to have separated oil removed. The enclosure 22 can include a coalescer lid 80 above the coalescer containment area 44, the lid normally covers an opening 81 into the containment area 44. The coalescer lid 80 can allow an operator to remove the coalescer spheres 46 which can be contained in a plurality of permeable flow through bags 82. As the system 10 is above ground it must include means to prevent the water in the system 10 from freezing. The system 10 can include a heater (316 in FIG. 3) that heats water that flows through pipe 86. The enclosure 22 can include drain plugs 90 in each of the sub-enclosures 32, 40 and 50. The enclosure 22 can also include a plurality of lugs 92 which can be used to lift and move the system 10. The oil O is stored in the upper half of the enclosure 22 above water. There is a liquid sensor 312 in the upper half that detects oil level O. Once the oil level hits a high level, an audio, visible alarm 74 and a remote alarm meaning off site can be powered. There is also a drain 76 disposed in the upper half of the enclosure 22 so user can drain oil off manually or can include an automatic drain 340 (FIG. 3) that would drain off oil responsive to the oil level full signal. A container (not shown) can be positioned to catch the drain off oil. The drain 76 allows for easy draining and eliminates the need to spend a lot of time in cleaning the enclosure 22.

The enclosure 22 can further include a mushroom vent 94 and an emergency vent 96. The enclosure 22 can also include a level 98 used when installing the system 10 to assure it is level.

Figure 2:
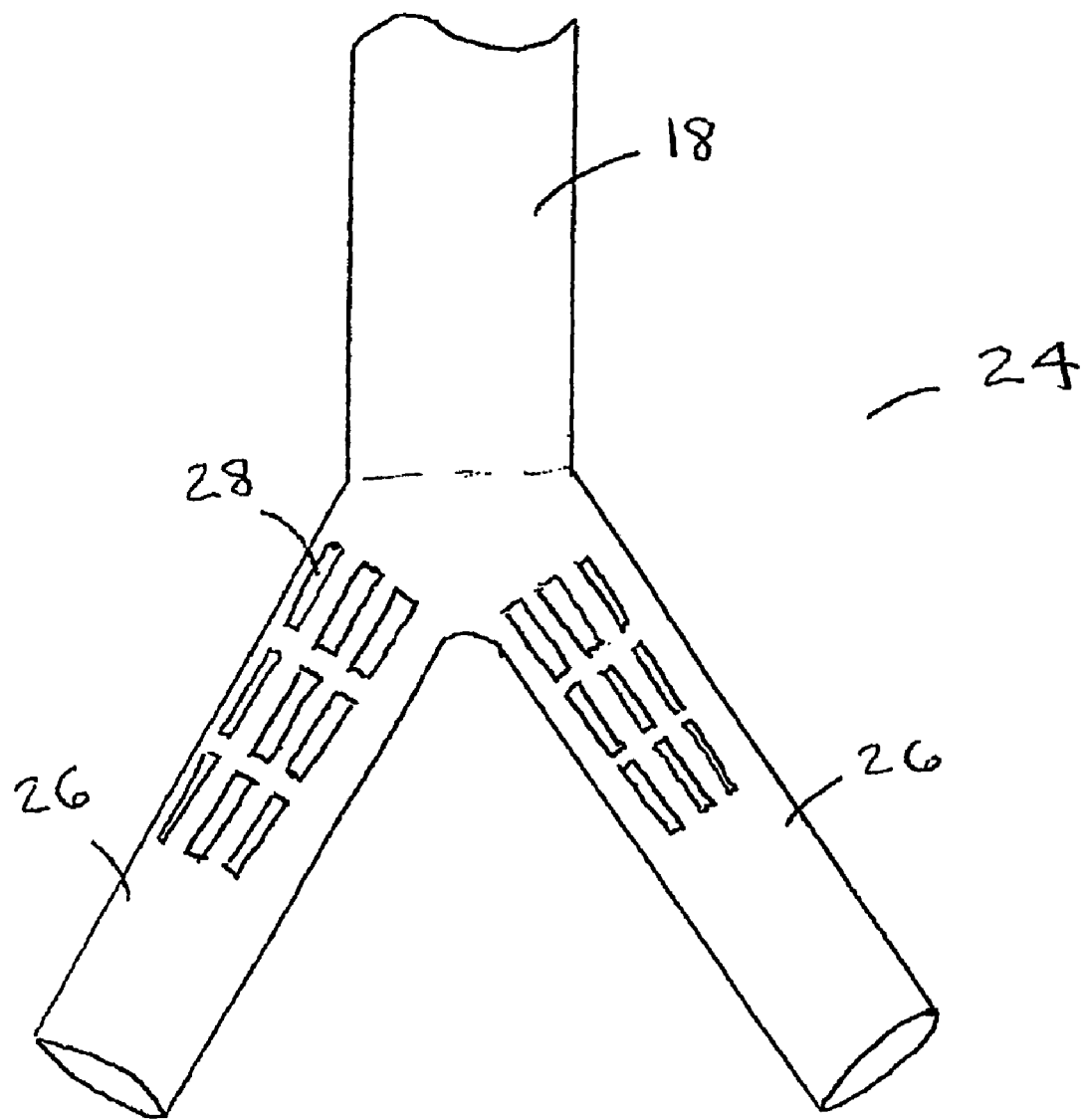
FIG. 2 shows details of the apparatus of FIG. 1.

FIG. 2 shows details of the Y-shaped diffuser pipe section 24. The diffuser pipe section 24 includes 2 arms 26 and an inlet connected to an inlet pipe 18. Each arm 26 includes a plurality of diffuser slots 28. The slots 28 spread the flow of inlet water into the first sub-enclosure 32 thereby reducing turbulence which is important to promote separation of immiscible oil and particles from the water.

Figure 3:
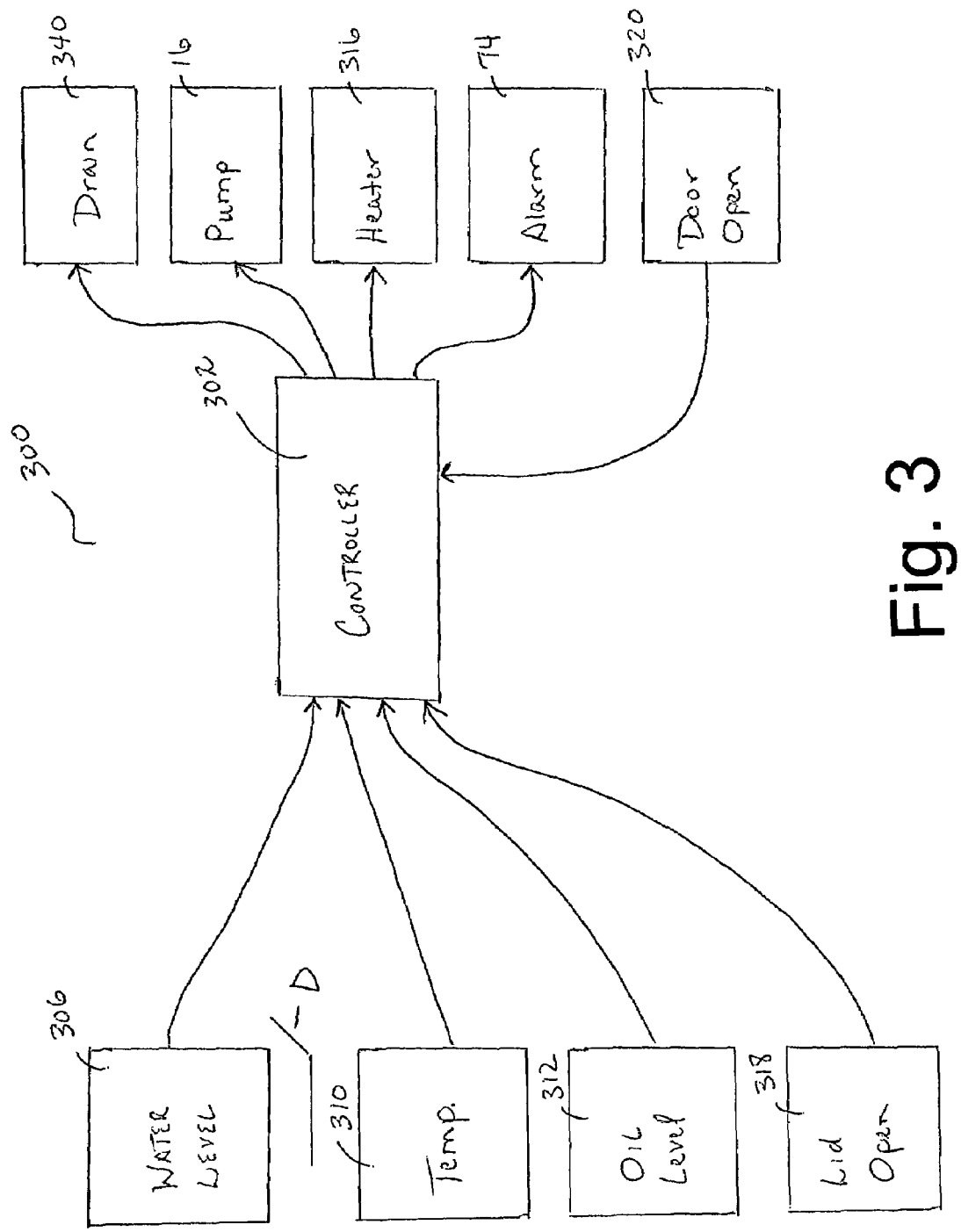
FIG. 3 shows the system controlled diagram of the apparatus of FIG. 1.

FIG. 3 shows the control 300 arrangement for the system 10. A controller 302 is provided and is housed in electrical panel 66. The controller 302 receives a signal from water level indicator 306 located in the dike D. The presence of the water in the dike D will cause the controller 302 to turn on pump 16 to bring water into the system 10.

A sensor 310 can sense the temperature surrounding the system 10. The controller 302 can receive a signal from the sensor 310 indicating that the temperature is below a preset value. If the external temperature is near or below freezing, the control 302 can activate a heater system 316 that can heat water that flows through pipe 86 and into the system 10 to prevent freezing of the system 10.

A sensor 312 can sense the level of separated oil present in the enclosure 22 and can send an alarm signal that can light alarm light 74, shut off pump 16 and send a cell phone signal to notify an operator of the need to service the system 10 by removing oil. The system 10 can include a lid open sensor 318 that will shut the system 10 down if the lid 80 is open and also a door open sensor 320 that will shut the system down if the control panel door 68 is open.

In operation when the alarm 74 indicates service is needed, the lid 80 can be removed and the bags 82 can be pulled out for visual inspection. The contents of the enclosure can be pumped out through the opening 81 in the top of the enclosure and the final contents can be drained through drain 90.

Although the description above contains many specificities, these should not be construed as limiting the scope of the invention but as merely providing illustrations of some of the presently preferred embodiments of this invention. As such, it is understood that the present invention is not limited to the embodiments described above, but encompasses any and all embodiments within the scope of the claims.

It will be obvious to those skilled in the art that modifications may be made to the embodiments described above without departing from the scope of the invention. Thus the scope of the invention should be determined by the claims in the formal application and their legal equivalents, rather than by the examples given.

I claim:

1. An above ground oil and water separation system comprising:
   a pump to draw water from a containment area, and to supply a flow of water to an enclosure,
   an enclosure inlet pipe taking water from said pump into said enclosure,
   a coalescing sub enclosure formed within said enclosure by a wall, said coalescing sub enclosure containing a plurality of coalescing spheres, and
   a heat source contained within an electrical panel attached to said enclosure to heat water in said enclosure to prevent freezing, wherein said coalescing sub enclosure includes an upper lid on a top surface of said enclosure and wherein said coalescing spheres are held in permeable removable bags within said coalescing sub enclosure such that said bags can be removed through an opening in the top of said coalescing sub enclosure when said lid is removed and wherein top surfaces of said bags are adjacent said lid.

2. The separation system as recited in claim 1, wherein said enclosure is divided into a first sub-enclosure receiving said inlet pipe and a second sub-enclosure wherein said first and second enclosures are separated by a wall and wherein said wall includes a plurality of pipes that allow water to flow from said first sub-enclosure to said second sub-enclosure.

3. The separation system as recited in claim 2, wherein said inlet pipe includes an end within said enclosure having a plurality of openings to diffuse the flow of water into said enclosure from said pump and wherein said enclosure includes a third sub-enclosure separated from said second sub-enclosure by said containment area.

4. The separation system as recited in claim 3, wherein said coalescing sub enclosure is defined by two walls having a plurality of openings to allow water to flow from said second sub-enclosure through said coalescing sub enclosure and into said third sub-enclosure and wherein said third sub-enclosure includes a water outlet to allow water to be removed from said enclosure.

5. The separation system as recited in claim 3, wherein said electrical panel is mounted on an exterior surface of said enclosure and includes a controller to send an alarm signal when an oil level within said enclosure reaches a predetermined level.

6. The separation system as recited in claim 1, wherein said inlet pipe includes an end within said enclosure having a plurality of openings to diffuse the flow of water into said enclosure from said pump.

7. An above ground oil and water separation system comprising:
- a pump to draw water from a containment area and to supply a flow of water to an enclosure,
- an enclosure inlet pipe taking water from said pump into said enclosure,
- a coalescing area formed within said enclosure including a first wall, said coalescing area containing a plurality of coalescing spheres, said coalescing spheres contained within a permeable bag within said coalescing area, and
- a heat source to heat said enclosure to prevent freezing, wherein said coalescing area includes an upper lid on a top surface of said enclosure and wherein said coalescing spheres are held in permeable removable bags within said coalescing area such that said bags can be removed through an opening in the top of said coalescing area when said lid is removed and wherein top surfaces of said bags are adjacent said lid.

8. The separation system as recited in claim 7, wherein said coalescing area includes an upper lid on a top surface of said enclosure and wherein said bags can be removed through an opening in the top of said coalescing area when said lid is removed.

9. The separation system as recited in claim 8, wherein an electrical panel is mounted on an exterior surface of said enclosure and includes a controller to send an alarm signal when an oil level within said enclosure reaches a predetermined level.

10. The separation system as recited in claim 9, wherein said enclosure is divided into a first sub-enclosure receiving said inlet pipe and a second sub-enclosure wherein said first and second enclosures are separated by a second wall and wherein said second wall includes a plurality of openings that allow water to flow from said first sub-enclosure to said second sub-enclosure.

11. The separation system as recited in claim 10, wherein said inlet pipe includes a plurality of openings to diffuse the flow of water into said enclosure from said pump and wherein said enclosure includes a third sub-enclosure separated from said second sub-enclosure by said coalescing area.

12. The separation system as recited in claim 11, wherein said coalescing area is defined by said first wall having a plurality of openings to allow water to flow from said second sub-enclosure through said coalescing area and a third wall having openings that allow water to flow into said third sub-enclosure from said coalescing area and wherein said third sub-enclosure includes a water outlet to allow water to be removed from said enclosure.

13. An above ground oil and water separation system comprising:
- a pump to supply a flow of water to an above ground enclosure,
- an enclosure inlet pipe taking water into said enclosure,
- a coalescing area formed within said enclosure including a first wall, said coalescing area containing a plurality of coalescing shapes, said coalescing shapes contained within a permeable bag within said coalescing area, and
- a heat source to heat said enclosure to prevent freezing, each said coalescing shape including a surface to aid in coalescing oil from said water, wherein said coalescing area includes an upper lid on a top surface of said enclosure and wherein said coalescing spheres are held in permeable removable bags within said coalescing area such that said bags can be removed through an opening in the top of said coalescing area when said lid is removed and wherein top surfaces of said bags are adjacent said lid.

14. The separation system as recited in claim 13, wherein said coalescing area includes an upper lid on a top surface of said enclosure and wherein said bag can be removed through an opening in the top of said coalescing area when said lid is removed.

15. The separation system as recited in claim 14, wherein an electrical panel is mounted on said enclosure and includes a control to send a signal when an oil level within said enclosure reaches a predetermined level.

16. The separation system as recited in claim 15, wherein said enclosure is divided into a first sub-enclosure receiving said inlet pipe and a second sub-enclosure wherein said first and second enclosures are separated by a second wall and wherein said second wall includes a plurality of pipes that allow water to flow from said first sub-enclosure to said second sub-enclosure.

17. The separation system as recited in claim 16, wherein said inlet pipe includes a plurality of openings to diffuse the flow of water into said enclosure from said pump and wherein said enclosure includes a third sub-enclosure separated from said second sub-enclosure by said coalescing area.

* * * * *